US010427589B2

United States Patent
Aichinger-Rosenberger et al.

(10) Patent No.: US 10,427,589 B2
(45) Date of Patent: Oct. 1, 2019

(54) WORK LIGHTING FOR A MACHINE, AND MACHINE HAVING THE WORK LIGHTING

(71) Applicant: HELLA GmbH & Co. KGaA, Lippstadt (DE)

(72) Inventors: Michael Aichinger-Rosenberger, Donau (AT); Dominik Fischer, Vienna (AT); Andreas Hingel, Enzersdorf an der Fischa (AT); Christoph Jandrisits, Olbendorf (AT); Gerhard Berger, Riedlingsdorf (AT); Bernhard Zettl, Hartberg (AT); Christian Derkits, St. Michael im Burgenland (AT); Karlheinz Kellner, Krems (AT); Thomas Posnicek, Haitzendorf (AT)

(73) Assignee: HELLA GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/180,464

(22) Filed: Nov. 5, 2018

(65) Prior Publication Data
US 2019/0143882 A1 May 16, 2019

(30) Foreign Application Priority Data
Nov. 10, 2017 (DE) .................. 10 2017 220 011

(51) Int. Cl.
*H05B 37/02* (2006.01)
*B60Q 1/14* (2006.01)
(Continued)

(52) U.S. Cl.
CPC ............... *B60Q 1/14* (2013.01); *B60Q 1/24* (2013.01); *G06F 3/013* (2013.01);
(Continued)

(58) Field of Classification Search
None
See application file for complete search history.

(56) References Cited

U.S. PATENT DOCUMENTS

| 2016/0200240 A1* | 7/2016 | Quinlan | B60Q 1/0023 315/80 |
| 2018/0146531 A1* | 5/2018 | Rinko | F21S 8/086 |

FOREIGN PATENT DOCUMENTS

| DE | 102005036002 A1 | 2/2007 |
| EP | 2158799 A1 | 3/2010 |

(Continued)

OTHER PUBLICATIONS

Extended European Search Report for European Application No. 18205330.6 dated Mar. 22, 2019, with its English summary, 9 pages.

*Primary Examiner* — Dedei K Hammond
(74) *Attorney, Agent, or Firm* — Rudy J. Ng; Bret E. Field; Bozicevic, Field & Francis LLP

(57) ABSTRACT

The present invention relates to a work lighting (100) for a machine (200) for generating an adaptive working illumination, comprising a plurality of lighting means (10) arranged in the form of a light-emitting matrix (20) to generate the working illumination, and at least one central adjusting unit (60, 70, 80) for separately adjusting the working illumination of the individual lighting means (10) in the light-emitting matrix. The invention further relates to a machine (200) having a work lighting (100) according to the invention.

12 Claims, 2 Drawing Sheets

Figure 1:
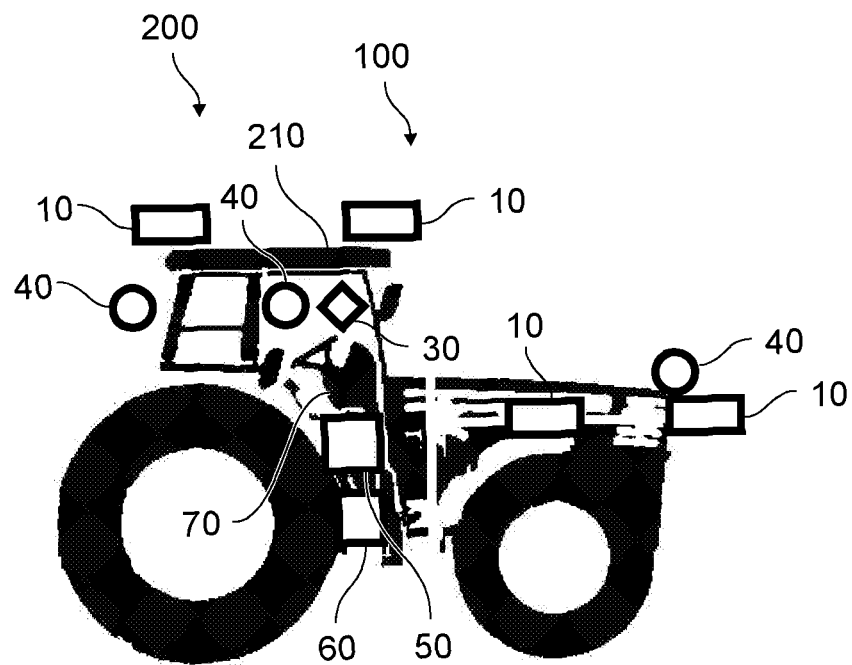

(51) Int. Cl.
*G06F 3/01* (2006.01)
*B60Q 1/24* (2006.01)

(52) U.S. Cl.
CPC ..... *H05B 37/0218* (2013.01); *H05B 37/0227* (2013.01); *B60Q 2300/21* (2013.01); *B60Q 2300/23* (2013.01); *B60Q 2300/314* (2013.01); *B60Q 2300/32* (2013.01)

(56) References Cited

FOREIGN PATENT DOCUMENTS

| | | |
|---|---|---|
| EP | 2415637 A1 | 2/2012 |
| EP | 3238993 A1 | 11/2017 |
| EP | 3363684 A1 | 8/2018 |
| WO | WO2016112387 A1 | 7/2016 |

\* cited by examiner

WORK LIGHTING FOR A MACHINE, AND MACHINE HAVING THE WORK LIGHTING

The present invention relates to a work lighting for a machine used to generate an adaptive working illumination. In addition, the invention relates to a machine having the work lighting. The invention particularly relates to a work lighting for machines for agricultural operations, such as tractors, combine harvesters, or harvesters.

In the prior art, work lightings with several work headlights for machines are known. These can be switched on, switched off, or dimmed as a whole by a user of the machine. By way of example, such a work lighting can be switched on by the user as darkness falls, or dimmed to prevent glare for others. With regard to the targeted illumination and/or dimming capability, however, the known work lightings are still unsatisfactory.

The object of the present invention is to at least partially address the problem described above. In particular, it is an object of the present invention to create a work lighting for a machine, as well as a machine having the work lighting, with improved illumination properties.

The above object is addressed by the claims. In particular, the above object is addressed by the work lighting according to claim 1, and the machine as described herein. Further advantages of the invention will become apparent from the dependent claims, the description and the drawings. In the following, each of the features and details which are described in the context of the work lighting also apply in connection with the machine according to the invention, and vice versa. As such, each disclosure of aspects of the invention is always relevant, or can be relevant, to both cases.

According to a first aspect of the present invention, a work lighting for a machine, used to generate an adaptive working illumination, is provided. The work lighting has a plurality of lighting means, which are arranged in the form of a light-emitting matrix which is used to generate the working illumination. Furthermore, the work lighting has at least one central adjusting unit for separately adjusting the working illumination of the individual lighting means in the light-emitting matrix.

The matrix lighting according to the invention enables a particularly fine adjustment of the work lighting with regards to both a desired illumination and to the dimming thereof. A matrix-form work lighting enables the explicit illumination of defined areas. These areas can be adjusted differently according to different environmental conditions—that is, for example, switched on, switched off, or dimmed. Each lighting means can be designed in the form of a work headlight. Each work headlight can itself have several sub-lighting-means.

The term 'adjusting unit' can be understood to mean a unit for the manual and/or automatic adjustment of the individual lighting means. As such, the adjusting unit can have a control unit for automatically adjusting the individual lighting means and/or an analog and/or digital operating unit for the manual adjustment of the individual lighting means. The operating unit can comprise a touch display, buttons and/or switches for inputting manual command signals for the adjustment of the lighting means.

The shape of the lighting means can basically be freely selected within technical limits. The light-emitting matrix forms the basis for adaptive functions according to the invention. Adaptive functions include all manual or automated adaptations of the work lighting to various environmental factors to increase the efficiency, safety and/or comfort of a user of the work lighting, as well as all third parties involved or not involved in his work.

Furthermore, it is possible for a work lighting according to the invention to have at least one environment detection unit for detecting environmental signals and generating at least one control signal based on the detected environmental signals, and for the adjusting unit to have a control unit for controlling and/or regulating the work lighting of the individual lighting means in the light-emitting matrix, wherein the at least one control unit is designed to adjust the working illumination of at least one of the lighting means as a function of the at least one control signal of the at least one environment detection unit.

As a result, an automated adjustment of the lighting means can be carried out in a simple and reliable manner. The term 'control and/or regulation' can be understood to mean the dimming and/or the switching on and/or off of individual regions and/or lighting means.

The lighting means can be understood as the smallest lighting unit of the work lighting—for example as light pixels of the light-emitting matrix. However, as described above, the lighting means can also have further sub-lighting-means in the form of luminous pixels in a row arrangement or in a matrix arrangement. Such a light-emitting matrix can have a plurality of rows of light, and a plurality of light columns, with a plurality of sub-lighting-means being arranged in each row of light and in each light column. The work lighting, and accordingly also the light-emitting matrix, can have at least four sub-lighting-means which are arranged in at least two columns and at least two rows. The lighting means can each have a solid angle size of about $22°\times11°$ to $22°\times22°$.

The work lighting is preferably designed as a mobile work lighting. The work lighting is configured for mobile work applications—for example, in and/or on a correspondingly mobile machine.

For a work lighting according to the invention, it can be advantageous if a control unit, in particular a so-called light control unit (LCU), is arranged upstream of the lighting means or the light-emitting matrix. The LCU can be configured and designed to evaluate the detected environmental signals. However, the function of the LCU can also be taken over by another control unit, such as a body control module (BCM), which can be in signal communication with the LCU. The at least one control unit corresponds to the LCU and/or the BCM.

The individual lighting means can be delimited from each other, or slightly overlapping with respect to the working illumination. The number of lighting means is basically freely selectable within technical limits. A reasonable number of lighting means can be selected depending on the purpose and mounting options.

The notion that the at least one control signal is generated based on the detected environmental signals is intended to be mean that the at least one control signal is generated using the detected environmental signals. In order to generate and/or specify the at least one control signal, further signals can also be used and/or taken into account.

The at least one control unit is preferably designed and configured to adjust the working illumination of at least one first lighting means independently of the at least one second lighting means as a function of the at least one control signal of the at least one environmental detection unit. That is, the lighting means can be adjusted—that is, switched on or off or dimmed—independently.

The present invention relates to a work lighting for a machine. A work lighting in the class differs in particular from the technical fields of street- or domicile lighting, and from lighting in the medical field. The present work lighting preferably has a brightness for which approval would not be given for a street vehicle. The work lighting in question should be particularly suitable for mobile machines, such as agricultural machinery, construction machinery, construction vehicles, heavy goods vehicles, or the like. Such machines can be tractors, combine harvesters, harvesters, forklifts, excavators, semi-trailers, cranes, or the like. A work lighting according to the invention with the above-described automatic environment communication is particularly useful for autonomous machines.

According to a further embodiment of the present invention, it is possible for the environment detection unit of a work lighting to have a light sensor to detect light signals and to generate at least one control signal based on the detected light signals. By way of example, glare can be detected by coupling the control unit to a light sensor. Based on the detected glare, individual lighting means can then be selectively dimmed or switched off. As a result, glare protection for the user or a person in the environment of the user of the work lighting can be realized in a simple and efficient manner. A light sensor according to the invention can be designed as an active or a passive light sensor. An active light sensor generates an electrical quantity as a result of incident light. A passive light sensor changes its internal electrical properties as a function of the incident light. The active or passive change of the sensor can be interpreted in analog and/or digital form, and has an impact on the current to the lighting means. By increasing and/or decreasing the current as a function of the sensor signal, the light intensity is automatically adapted to, for example, reflected light. The more light is reflected, the lower the current and the lower the emitted light, until the lighting means has reached the level at which there is no more glare. The threshold perceived as unpleasant, wherein the dimming proceeds from the same, depends on the intended use, and can be adapted by changing the circuit parameters.

Furthermore, in the case of a work lighting according to the present invention, the environment detection unit has an image sensor, in particular a camera, for capturing image signals from the environment of the work lighting and generating at least one control signal based on the captured image signals. The image sensor, for example in the form of the camera, can detect weather conditions such as rain or fog. If rain and/or fog are detected, a corresponding control signal can be generated based on the same, by means of which the working illumination can be easily adapted to current requirements.

In addition, in the case of a work lighting according to the invention, it is possible for the environment detection unit to have an object detection unit to detect at least one object in the vicinity of the work lighting, and to generate at least one control signal based on the at least one detected object. The object detection unit can have an ultrasound and/or a radar unit for the object detection. The work lighting can be greatly increased by the targeted object detection when, for example, an object is detected that could cause damage to the machine and/or that could be damaged by the machine itself. In the case of simultaneous work performed in an agricultural environment, the object detection unit can also prevent glare from work headlights of other actors in the field, by the object detection detecting other vehicles and dimming or switching off the corresponding lighting means via the control unit.

In an embodiment variant according to the invention, the at least one lighting means of a work lighting can be designed to generate working illumination of at least 2,000 lumens. That is, the lighting means is capable of generating working illumination with a luminous flux of at least 2,000 lumens. As a result, the work lighting differs fundamentally from lighting systems that are used, for example, in road traffic, in general medicine, or in the home. In principle, it is even possible that each of the lighting means has a luminous flux of at least 2,000 lumens.

Furthermore, it is possible that a plurality of lighting means, each with at least 2,000 lumens, are arranged in a work lighting according to the invention to generate a working illumination. The working illumination of the work lighting can thereby be increased by, for example, 4000 lumens, 6000 lumens, or more than 10,000 lumens. Such a luminous flux can make the difference, in generic machines, between whether the work can be done satisfactorily or not, especially in difficult weather and/or environmental conditions.

In addition, it is possible that an eye-tracking system used to capture viewing information of a user of the work lighting and used to generate at least one eye-tracking control signal is arranged in a work lighting according to the present invention, wherein the at least one control unit is designed to adjust the working illumination of at least one of the lighting means depending on the at least one control signal of the at least one environment detection unit and depending on the at least one eye-tracking control signal from the eye-tracking system. By coupling the control unit with the eye-tracking system, the working illumination can be adjusted to the needs of a user of the work lighting. The eye-tracking system can be designed in the form of a headset which the user can put on like a pair of glasses. As a result, the eye movement of the user can be detected particularly accurately. The eye-tracking system can also be arranged remotely from the user—for example, in a driver's cab of the machine in the field of vision of the user. This ensures unrestricted freedom of movement and visibility for the user.

It is also possible that a head-tracking system for detecting viewing information of a user of the work lighting and generating at least one head-tracking control signal, based on the captured viewing information, is arranged in a work lighting according to the invention, wherein the at least one control unit is designed to adjust the working illumination of at least one of the lighting means depending on the at least one control signal of the at least one environment detection unit, and depending on the at least one head-tracking control signal of the head-tracking system. The head-tracking system can also capture the user's viewing information. Compared to the eye-tracking system, the viewing information can be determined in a particularly simple and cost-effective manner—for example, by means of a simple camera which is installed in the dashboard area of the machine and/or in the cabin, by way of example.

It can be of further advantage if the at least one environmental detection unit is arranged in a work lighting according to the invention on the at least one lighting means or in the immediate vicinity of the at least one lighting means. The lighting means can therefore have an integrated light sensor and/or light reference sensor. In particular, a plurality of lighting means of the work lighting can be equipped with a light sensor, and/or at least one light sensor can be arranged on each of a plurality of lighting means. As a result of the positioning of the environment detection unit on the at least one light-emitting means, the at least one light-emitting means can be selectively adjusted as desired with respect to third parties.

In accordance with a further aspect of the present invention, a machine having a work lighting as described in detail above is provided. The machine has a cabin and/or a work cabin for a user of the work lighting, and thus also of the machine. In this way, a machine according to the invention brings with it the same advantages as have been described in detail with reference to the work lighting according to the invention. As already mentioned above, the machine is understood in particular to mean an agricultural machine, a construction machine, a construction vehicle, a heavy goods vehicle, or the like. Such a machine can be a tractor, a combine harvester, a forklift, an excavator, a semi-trailer, a crane, a harvester, or the like. The term 'cabin' is used to mean a driver- and/or user cabin in which the user or driver of the machine is situated while he operates the machine. The cabin can be an open or a closed/closeable cabin. The term 'cabin' is generally used to mean a delimited or predefined location or a corresponding space on or in which a person is situated during use of the machine.

In addition, in a machine according to the invention, the central adjusting unit can have an actuating unit for manual, separate adjustment of the working illumination of the individual lighting means. The manual operating unit and/or a unit for manual operation and/or actuation of the lighting means offers the user a particularly simple way of adjusting the individual lighting means—for example, in the form of headlights—as required. The manual operating unit can have a touch display, buttons and/or switches for manual operation of the individual lighting means. The operating unit is preferably arranged in the cabin, in particular in a dashboard area in the cabin. In this area, the operating unit is easily accessible to the user and accordingly easy to operate.

In a further embodiment variant of the present invention, it is possible that the at least one environment detection unit is arranged in the cabin, in particular in the field of vision and at eye level for a user in the cabin. As a result, the work lighting can be adjusted in a simple and reliable manner to the needs of the user. Preferably, the at least one environment detection unit is arranged in the cabin in such a manner that it is located near the eyes of the user—for example, on average closer than 50 cm from the eyes of the user. In this case, a working position, in particular a sitting position, of the user is assumed.

Further measures improving the invention will become apparent from the following description of various embodiments of the invention, which are shown schematically in the figures. Any features and/or advantages resulting from the claims, the description or the drawing, including constructive details and spatial arrangements, can be essential to the invention, both individually and in the various combinations.

Figure 2:
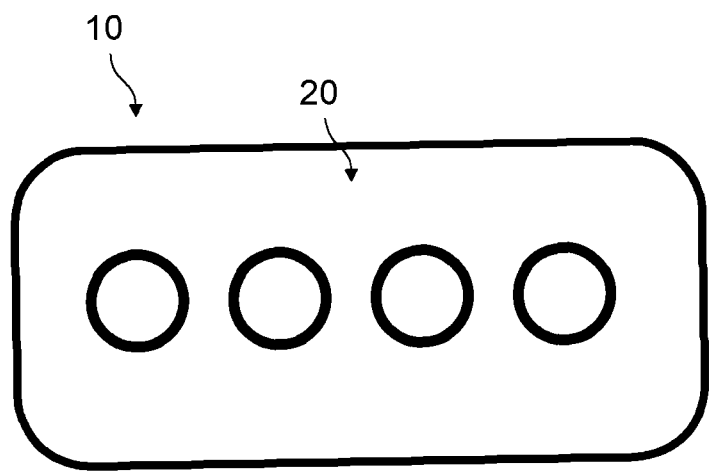
Figure 3:
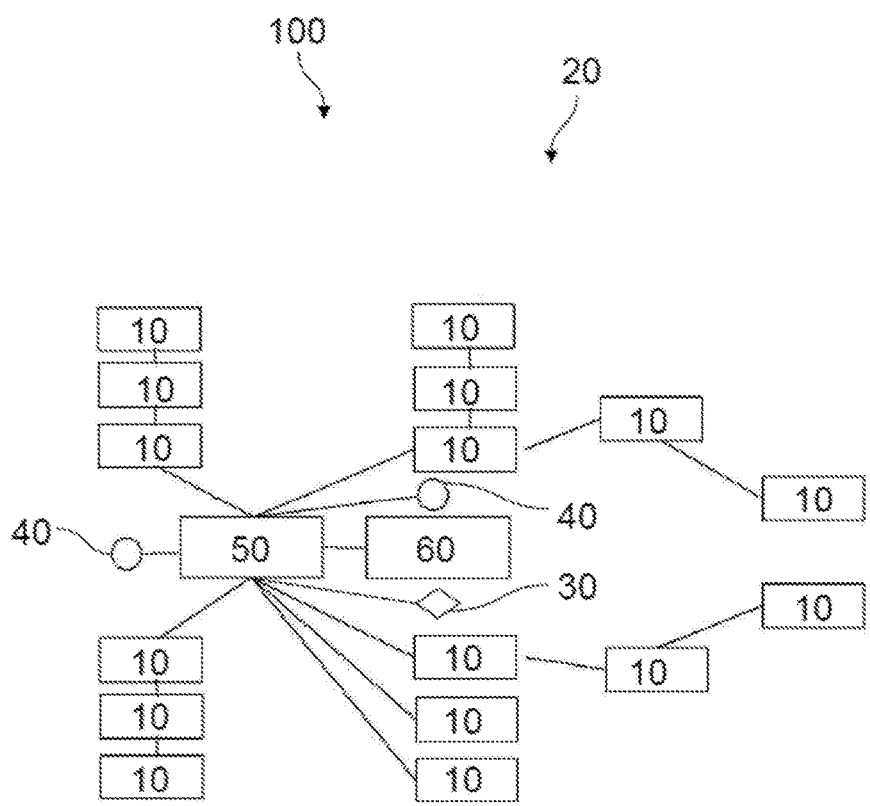

The invention is explained in more detail below with reference to the accompanying drawings, wherein:

FIG. 1 shows a machine having a work lighting according to an embodiment of the invention, FIG. 2 shows a lighting means according to the invention, and FIG. 3 shows a work lighting according to an embodiment of the invention, illustrated separately from a machine.

Elements with the same function and mode of operation are each indicated by the same reference numerals in the figures.

FIG. 1 shows a machine 200 in the form of a tractor with a work lighting 100 mounted thereon used to generate an adaptive working illumination. The machine 200 has a cabin 210 for a user of the machine 200 and the work lighting 100.

As shown in FIG. 1, an environment detection unit 40 is arranged in the cabin 210 of the machine 200 in the field of view and at eye level of a user (not shown) located in the cabin 210. Further environment detection units 40 are arranged in the vicinity of the lighting means 10.

The work lighting 100 of the machine 200 shown in FIG. 1 has eight (four are shown) lighting means used to generate the work lighting. The work lighting 100 also has six (three are shown) environment detection units 40. The environment detection units 40 each have a light sensor for detecting light signals and generating a control signal based on the detected light signals. The work lighting 100 also has an adjusting unit 70 in the form of a manual control unit, an adjusting unit 50 with a control unit in the form of an LCU, and an adjusting unit 60 with a control unit in the form of a BCM for controlling and/or regulating the working illumination of the individual lighting means 10, wherein an LCU is configured to adjust the working illumination of at least one of the lighting means 10 as a function of the different control signals of the environment detection unit. In addition to the light sensors, the environment detection units 40 have an image sensor for capturing image signals from the environment of the work lighting 100 and generating a control signal based on the captured image signals, and an object detection unit for detecting at least one object in the vicinity of the work lighting 100 and generating a control signal based on the at least one detected object.

The lighting means 10 are each designed to generate work lighting with about 2,000 lumens. An eye-tracking system 30 is further arranged in the cabin 210 for capturing viewing information of a user of the work lighting 100 and for generating an eye-tracking control signal based on the captured viewing information. In addition, or as an alternative to the eye-tracking system 30, a head-tracking system with a mode of operation corresponding to the eye-tracking system can also be arranged in the cabin 210. Accordingly, the LCU is configured to adjust the working illumination of at least one of the lighting means 10 according to the control signals of the environment detection unit 40 and according to the eye-tracking control signal of the eye-tracking system 30.

FIG. 2 is an enlarged illustration of a lighting means 10 shown in FIG. 1. As can be seen in FIG. 2, the lighting means 10 has four sub-lighting-means in the form of four LEDs.

FIG. 3 shows a work lighting 100 detached from a machine 200. The work lighting 16 illustrated in FIG. 3 has lighting means 10 which are signal-connected to the control unit in the form of the LCU. That is to say, the arrangement of the lighting means 10 shown in FIG. 3 is understood to be a matrix arrangement. The LCU is in signal communication with the control unit in the form of the BCM. In addition, two environment detection units 40 in the form of light sensors 40, and an eye-tracking system 30, are in signal communication with the LCU.

In addition to the illustrated embodiments, the invention allows for further basic designs. That is, the invention should not be considered limited to the embodiments shown in the figures.

LIST OF REFERENCE NUMBERS 10 lighting means
20 light-emitting matrix
30 eye-tracking system
40 environment detection unit
50 adjusting unit (LCU, control unit)

60 adjusting unit (BCM, control unit)
70 adjusting unit (manual operating unit)
100 work lighting

The invention claimed is:

1. A work lighting for a machine for generating an adaptive working illumination, comprising a plurality of lighting arranged in the form of a light-emitting matrix used to generate the working illumination, and at least one central adjuster for separately adjusting the working illumination of the individual lighting in the light-emitting matrix,
wherein
at least one environment detector is arranged for detecting environmental signals and for generating at least one control signal based on the detected environmental signals,
the adjuster comprises a controller for at least controlling or regulating the working illumination of the individual lighting in the light-emitting matrix, and
the controller adjusts the working illumination of at least one of the lighting depending on the at least one control signal of the at least one environment detector,
wherein the work lighting further comprises a head-tracking system for capturing viewing information of a user of the work lighting and generating at least one head-tracking control signal based on the captured viewing information, wherein the controller adjusts the working illumination of at least one of the lighting depending on the at least one control signal of the at least one environment detector and depending on the at least one head-tracking control signal of the head-tracking system.

2. The work lighting according to claim 1, wherein the environment detector comprises a light sensor for detecting light signals and generating at least one control signal based on the detected light signals.

3. The work lighting according to claim 1, wherein the environment detector has an image sensor for capturing image signals from the environment of the work lighting and generating at least one control signal based on the captured image signals.

4. The work lighting according to claim 1, wherein the environment detector has an object detector for detecting at least one object in the vicinity of the work lighting and generating at least one control signal based on the at least one detected object.

5. The work lighting according to claim 1, wherein at least one of the lighting is designed to generate working illumination with at least 2,000 lumens.

6. The work lighting according to claim 1, wherein a plurality of lighting are arranged to generate the work lighting, each having at least 2,000 lumens.

7. The work lighting according to claim 1, wherein an eye-tracking system is arranged to capture viewing information of a user of the work lighting and to generate at least one eye-tracking control signal based on the captured viewing information, wherein the at least one controller is designed to adjust the working illumination of at least one of the lighting depending on the at least one control signal of the at least one environment detector and depending on the at least one eye-tracking control signal of the eye-tracking system.

8. The work lighting according to claim 1, wherein the at least one environment detector is arranged on the at least one lighting or in the immediate vicinity of the at least one lighting.

9. A machine having a work lighting according to claim 1, comprising a cabin for a user of the work lighting.

10. The machine according to claim 9, wherein the central adjuster has an operator for the manual, separate adjustment of the working illumination of the individual lighting.

11. The machine according to claim 10, wherein the operator is arranged in the cabin.

12. The machine according to claim 9, wherein the at least one environment detector is arranged in the cabin.

* * * * *